(12) United States Patent
Osari et al.

(10) Patent No.: US 6,219,502 B1
(45) Date of Patent: Apr. 17, 2001

(54) IMAGE FORMATION APPARATUS FOR FORMING IMAGE ON SHEET ACCORDING TO INPUT JOB

(75) Inventors: Yoshihito Osari; Shokyo Koh; Mitsuhiko Sato, all of Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,417

(22) Filed: Dec. 22, 1998

(30) Foreign Application Priority Data

Dec. 26, 1997 (JP) .................................................. 9-358681

(51) Int. Cl.$^7$ .................................................. G03G 15/00
(52) U.S. Cl. .................................. 399/82; 399/85; 399/87
(58) Field of Search ....................... 271/9, 288; 399/19, 399/75, 82, 85, 87, 361, 367

(56) References Cited

U.S. PATENT DOCUMENTS

| | | | |
|---|---|---|---|
| 3,390,905 | * | 7/1968 | Stewart . |
| 4,099,860 | * | 7/1978 | Connin ................................... 399/82 |
| 4,692,052 | | 9/1987 | Yee ........................................ 403/13 |
| 4,907,031 | * | 3/1990 | Kawatsura et al. .................... 399/82 |
| 4,947,345 | | 8/1990 | Paradise et al. ...................... 364/519 |
| 4,956,667 | * | 9/1990 | Gartner ................................... 399/82 |
| 5,117,597 | * | 6/1992 | Feller .................................... 52/199 |
| 5,365,715 | | 11/1994 | Steinmetx ........................... 52/726.1 |
| 5,365,717 | * | 11/1994 | Steinmetz et al. ..................... 52/726 |

* cited by examiner

*Primary Examiner*—Arthur T. Grimley
*Assistant Examiner*—Hoang Ngo
(74) *Attorney, Agent, or Firm*—Fitzpatrick, Cella, Harper & Scinto

(57) ABSTRACT

An image formation apparatus can form an image on a paper sheet according to each of a plurality of input job, and also can selectively perform a sheet process, such as sorting or stapling, for the sheets on which the images are formed. The apparatus controls, according as whether or not the sheet process is included in a first job in which the apparatus is forming an image and in a second job which is input after the first job is input, whether or not an interruption operation of the second job is to be permitted. The interruption operation consists of stopping execution of the first job in order to perform the second job instead. This enables the first job to halt temporarily, until the second job is complete, so that the pages of the first job will not become mixed in with the page of the second job, thereby preventing the pages of two different jobs from being stapled together.

83 Claims, 10 Drawing Sheets

IMAGE FORMATION APPARATUS FOR FORMING IMAGE ON SHEET ACCORDING TO INPUT JOB

BACKGROUND OF THE INVENTION

1. Field of the Invention

The present invention relates to an image formation apparatus which forms an image on a paper sheet in accordance with an input job.

2. Related Background Art

Conventionally, an image formation apparatus having functions of both a printer and a copy machine has been known. As new network techniques have been recently developed, such image formation apparatus has coped with the network technique. For example, plural kinds of apparatuses which can process plural print jobs respectively sent from plural clients on a network have been provided. Further, some of these apparatuses can set a priority order in print output for each of the plural print jobs including a copy job, in accordance with its output urgency. By providing such a function, it is possible to realize user-friendly print scheduling.

When original images are printed respectively on cut sheets and these sheets are output, the image formation apparatus must perform plural image input processes corresponding to the number of output sheets. However, if such the image formation apparatus has an image storage means (i.e., image server) such as a hard disk or the like for storing a large amount of image data, this apparatus can print the plural sheets by performing only a single image input process for all the original images. By providing such a function, since the image input process can be shortened, a time which is necessary to, e.g., gather sheaves of originals or transfer the original on the network and which restricts a user can be also shortened. Therefore, the plural print jobs can be effectively processed by this function together with the above print scheduling function.

Further, a image formation apparatus having a discharge process unit has been known. In this unit, the cut sheets on which the images have been respectively formed are subjected to a postprocess such as page arrangement (i.e., sorting) or the like, and the processed sheets are then discharged. As the discharge process unit, there are two types of units, i.e., a sorter-type discharge process unit and a finisher-type discharge process unit. In the sorter-type discharge process unit, since the sorting of the plural sheets is simultaneously performed based on such a feature as above that the plural sheets can be printed in one image input process, finishing of a sheaf of cut sheets (referred as an output sheaf hereinafter) as a final output is delayed. On the other hand, in the finisher-type discharge process unit, sorting is performed for each group of sheets, and also the output sheaf is formed for each sorted group. Recently, in the image formation apparatus which has both the above image storage means and the discharge process unit, the finisher-type discharge process unit has been frequently used. Also, the discharge process unit having a so-called stapling function to bind or staple the sheaf of a part of the sorted sheets with styluses has been known.

However, the finisher-type discharge process unit having the stapling function basically has a structure to perform stapling after the output sheets are stacked and thus the output sheaf is formed on one process tray. For this reason, while a first print job is being executed according to a predetermined priority order, when an output demand of a second print job whose priority order is higher than that of the first print job is issued, if it has been set to perform the stapling in both the first and second print jobs, a following problem occurs. That is, if the second print job is executed in interruption, the output sheaves of the first and second print jobs overlap on the process tray, and it becomes difficult to correctly perform the stapling.

Further, the finisher-type discharge process unit having the stapling function basically has a structure to discharge the output sheaves on one paper discharge tray. For this reason, if the first print job is stopped temporarily and instead the second print job is executed in interruption, the output sheaf of the second job overlies on that of the first job on the paper discharge tray. Therefore, after the second job terminates, if the first job restarts before the output sheaf of the second job is removed from the tray, the output sheaf of the second job is mixed up with that of the first job. In this case, it is difficult for the user to discriminate which output sheaf is his own in the plural output sheaves stacked on the paper discharge tray.

SUMMARY OF THE INVENTION

An object of the present invention is to provide an image formation apparatus which solves such problems as described above.

Another object of the present invention is to provide an image formation apparatus which can perform job priority processes respectively suitable for a job containing a sheet process and a job containing no sheet process.

Other objects and features of the present invention will become apparent from the following detailed description and the accompanying drawings.

DETAILED DESCRIPTION OF PREFERRED EMBODIMENTS

Hereinafter, the embodiments of the present invention will be explained with reference to the accompanying drawings. In the embodiments, an image formation apparatus which has a copy function, a facsimile function and a printer function and can simultaneously receive plural print jobs to be executed in the respective functions will be described.

First Embodiment

With reference to FIGS. 1 to 9, the first embodiment of the present invention will be explained in order of:

(1) a mechanical structure of the image formation apparatus;

(2) an entire structure of a control system in the apparatus;

(3) a structure of an image process unit in the apparatus;

(4) a structure of an image memory unit in the apparatus;

(5) a structure of an external interface process unit in the apparatus;

(6) a configuration of an operation unit in the apparatus; and (7) an operation of the apparatus.

Mechanical Structure of Image Formation Apparatus

Initially, the mechanical structure of the image formation apparatus according to the first embodiment will be explained with reference to FIG. 1.

Figure 1:
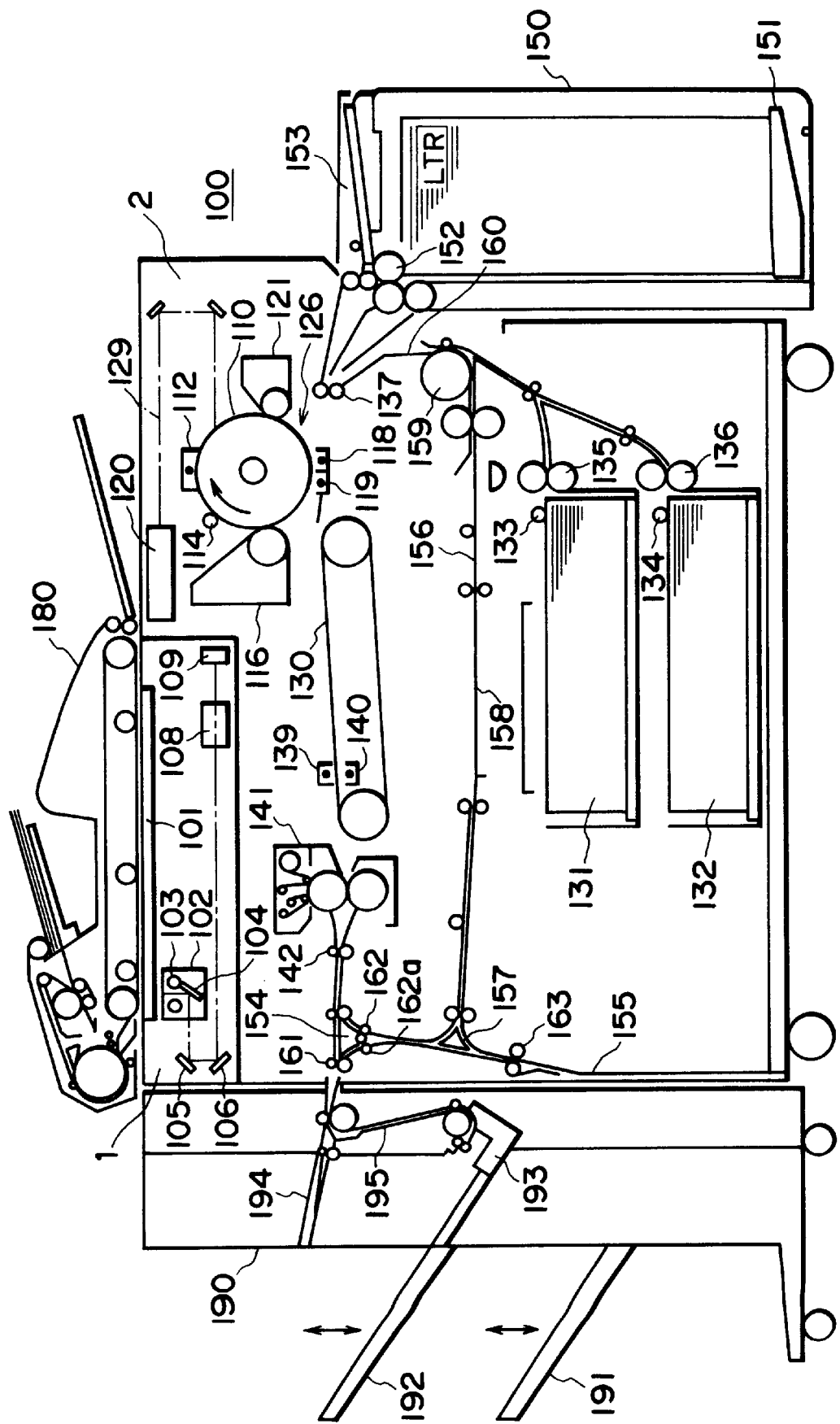
FIG. 1 is a schematic view showing a mechanical structure of an image formation apparatus according to a first embodiment of the present invention.

In FIG. 1, numeral 100 denotes the image formation apparatus on which an automatic original feeder device (document feeder: DF) 180 is mounted. An original is fed from the DF 180 to a platen glass 101 acting as an original mounting board. Numeral 102 denotes a scanner which is composed of an original illumination lamp 103, a scanning mirror 104 and the like. The scanner 102 is reciprocated along a predetermined direction by a not-shown motor. Light generated from the lamp 103 is reflected by an original put on the platen glass 101 and then input to a CCD sensor (image sensor) 109 through a lens 108 by the scanning mirrors 104 to 106, whereby an image of the original is converted into an electrical signal.

Numeral 120 denotes an exposure control unit which is composed of a laser, a polygonal scanner and the like. The unit 120 performs a later-described predetermined image process on the electrical signal converted by the CCD sensor 109. Then, the unit 120 irradiates onto a photosensitive drum 110 laser beam 129 which has been modulated based on an image signal obtained by the image process, an image signal received by the facsimile function, or an image signal based on print job data received from an external computer.

A primary charger 112, a development unit 121, a transfer charger 118, a cleaning unit 116 and a preexposure lamp 114 are arranged around the photosensitive drum 110. In an image formation unit 126 composed of these elements, the photosensitive drum 110 is rotated by a not-shown motor in a direction indicated by an arrow, charged at desired potential by the primary charger 112, and then irradiated with the laser beam 129 from the exposure control unit 120, whereby an electrostatic latent image is formed on a surface of the drum 110. The formed image is developed by the development unit 121, and visualized as a toner image.

On the other hand, a transfer paper sheet (cut sheet) fed from an upper cassette 131 by a pickup roller 133 or from a lower cassette 132 by a pickup roller 134 is carried by feed rollers 135 or 136, and then carried to a transfer belt 130 by resist rollers 137. Thus, the visualized toner image is transferred onto the sheet by the transfer charger 118. After the image is transferred, a residual toner on the drum 110 is cleaned by the cleaning unit 116, and also residual charges are eliminated by the preexposure lamp 114. Further, the sheet onto which the image has been transferred is separated from the transfer belt 130, the toner image is again charged by prefixing chargers 139 and 140, and the sheet is fed to a fixing unit 141. Thus, the toner image is pressed and heated to be fixed to the sheet, and then the sheet is discharged by discharge rollers 142.

In the body of the image formation apparatus 100, a deck 150 capable of holding, e.g., 4000 transfer paper sheets is provided. A lifter 151 of the deck 150 goes up according to an amount of the held sheets such that the sheet always contacts with a paper feed roller 152. Also, a multi-type manual paper feed unit 153 capable of holding 100 transfer paper sheets is provided.

In FIG. 1, numeral 154 denotes a paper discharge flapper used to switch a feed path of the transfer paper sheet fed from paper discharge rollers 142 between a lower feed path 158 and a discharge-side path. The lower feed path 158 guides the sheet fed by the rollers 142 and reversed through a reverse path 155, to a paper refeed tray 156. Numeral 157 denotes a multiflapper used to change or switch the path between a double-face recording feed path and a multirecording feed path. When the multiflapper 157 is moved leftward, the sheet is directly guided to the lower feed path 158 without feeding it to the reverse path 155. Numeral 159 denotes a paper feed roller feeding the transfer paper sheet from the lower feed path 158 to the image formation unit 126 through a path 160. Numeral 161 denotes discharge rollers provided in the vicinity of the flapper 154 to outwardly discharge the transfer paper sheet guided to the discharge side by the flapper 154.

In case of double-face recording (i.e., double-face copy) or multirecording (i.e., multicopy), the flapper 154 is moved upward such that the transfer paper sheet already subjected the record process is fed to the paper refeed tray 156 through the paths 155 and 158. In case of the double-face recording, the multiflapper 157 is moved rightward to reverse and feed the sheet. On the other hand, in case of the multirecording, the multiflapper 157 is moved leftward to feed the sheet as it is. The sheets stacked on the paper refeed tray 156 are fed one by one from the bottom of sheaf to the resist rollers 137 by the paper feed roller 159 through the path 160, whereby the recording on the sheet is again performed by the image formation unit 126.

When the transfer paper sheet is reversed and discharged from the body of the apparatus 100, the paper discharge flapper 154 is moved upward and the multiflapper 157 is moved rightward to feed the recording-processed sheet to the side of the reverse path 155. After a trailing edge of the sheet passed through a first feed roller 162, the flapper 154 is moved rightward to feed the paper to a second feed roller 162a by reverse rollers 163. Then, the sheet is reversed and discharged by the discharge rollers 161. When the sheet is not reversed but is discharged from the apparatus 100 as it is, the flapper 154 is moved downward to discharge the sheet as it is by the rollers 161.

Numeral 190 denotes a paper discharge process unit which performs a postprocess (sorting and stapling) to align the sheets discharged from the body of the apparatus 100 and then bind them into a sheaf. In a case where a discharged-sheaf postprocess operation (sorting and stapling) is not set by a later-described operation unit 172 or the like, the transfer paper sheet is discharged one by one onto a paper discharge tray 192 (i.e., transfer paper sheet stacking means) through a feed path 194 in the unit 190. At this time, the sheet does not pass through a process tray 193. The sorting is performed by switching two processes for each job, i.e., one process to move the sheet rightward in a feeding direction and the other process to move the sheet leftward.

In a case where the discharged-sheaf postprocess operation is set, the transfer paper sheets are stacked one by one on the process tray 193 through a feed path 195, and the stacked sheets are aligned. When the stacking of a certain number of image-formed sheets terminates, a sheaf of the sheets is stapled, and then the stapled sheaf is discharged onto a paper discharge tray 191 or 192. In the first embodiment, the sheaf is basically discharged onto the tray 191. However, if the tray 191 is already full of the sheets and thus it is impossible to discharge the sheaf onto the tray 191, it is controlled to switch the tray 191 to the tray 192. For this reason, it is controlled to move the trays 191 and 192 up and down by a not-shown motor, whereby the tray to which the sheaf is to be discharged is moved to a position of the tray 193 before the image formation operation starts.

Entire Structure of Control System

In the following section, the structure of the control system of the image formation apparatus 100 will be explained with reference to the block diagram shown in FIG. 2.

Figure 2:
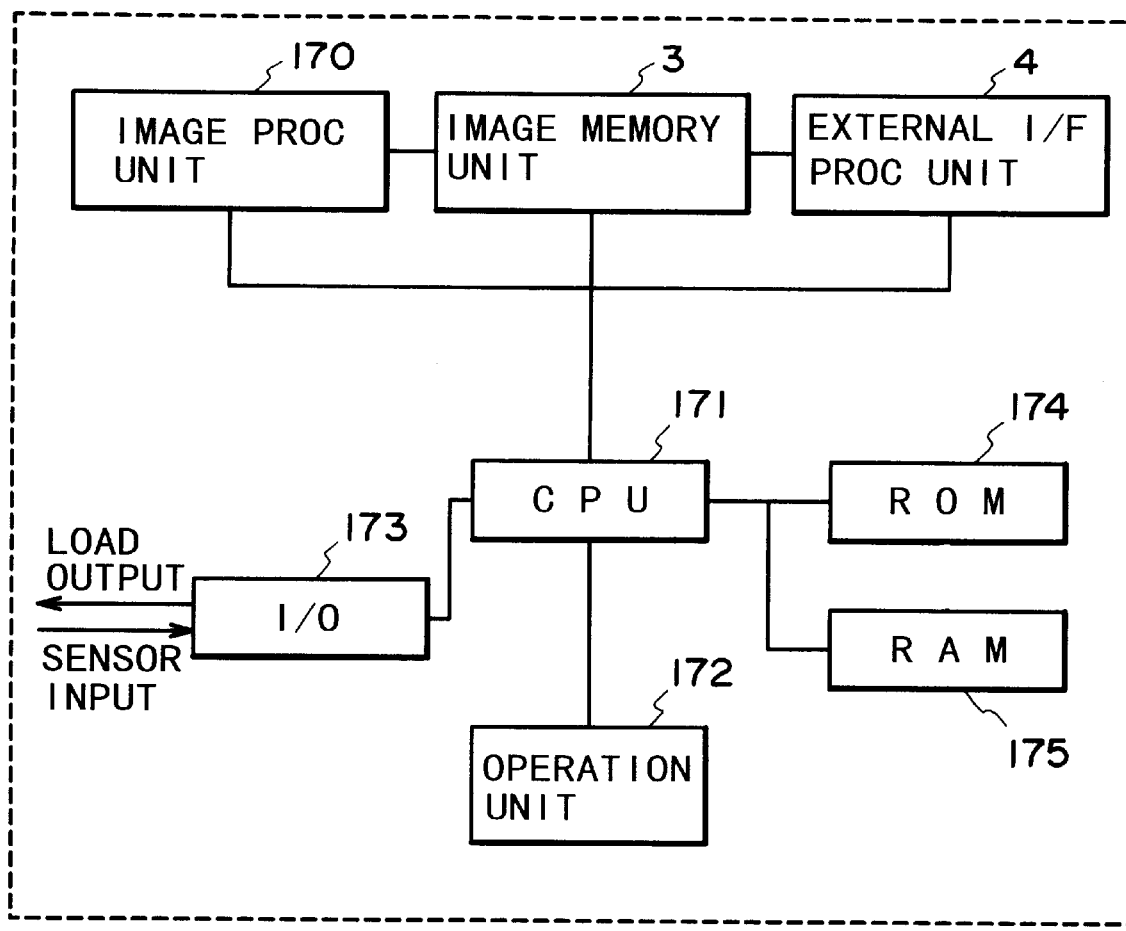
FIG. 2 is a block diagram showing a structure of a control system in the apparatus.

In FIG. 2, numeral 171 denotes a CPU for performing basic control of the image formation apparatus 100. A ROM 174 storing control programs, a RAM 175 used as a working area for the process, and an input/output (I/O) port 173 are connected to the CPU 171 by using address and data buses. Further, not-shown various loads such as motors, clutches and the like of drive mechanisms for driving respective units of the apparatus 100, and not-shown input means such as sensors and the like for detecting a paper sheet position and the like are connected to the port 173. The CPU 171 performs an image formation operation by sequentially controlling data input and output operations through the port 173 according to the control programs in the ROM 174. Further, since the operation unit 172 is connected to the CPU 171, the CPU 171 controls an display means and a key input means of the unit 172. An operator instructs the CPU 171 to change an image formation operation mode and a displaying state by using the key input means, and the CPU 171 displays a state of the apparatus 100 and the operation mode set by the key input. Furthermore, an image process unit 170 for processing the electrical signal converted by the image sensor unit 109, an image memory unit 3 for storing therein the processed images, and an external interface (I/F) process unit 4 for performing facsimile communication and data communication with the external computer are connected to the CPU 171.

Structure of Image Process Unit

In the following section, the detailed structure of the image process unit 170 will be explained with reference to the block diagram shown in FIG. 3.

Figure 3:
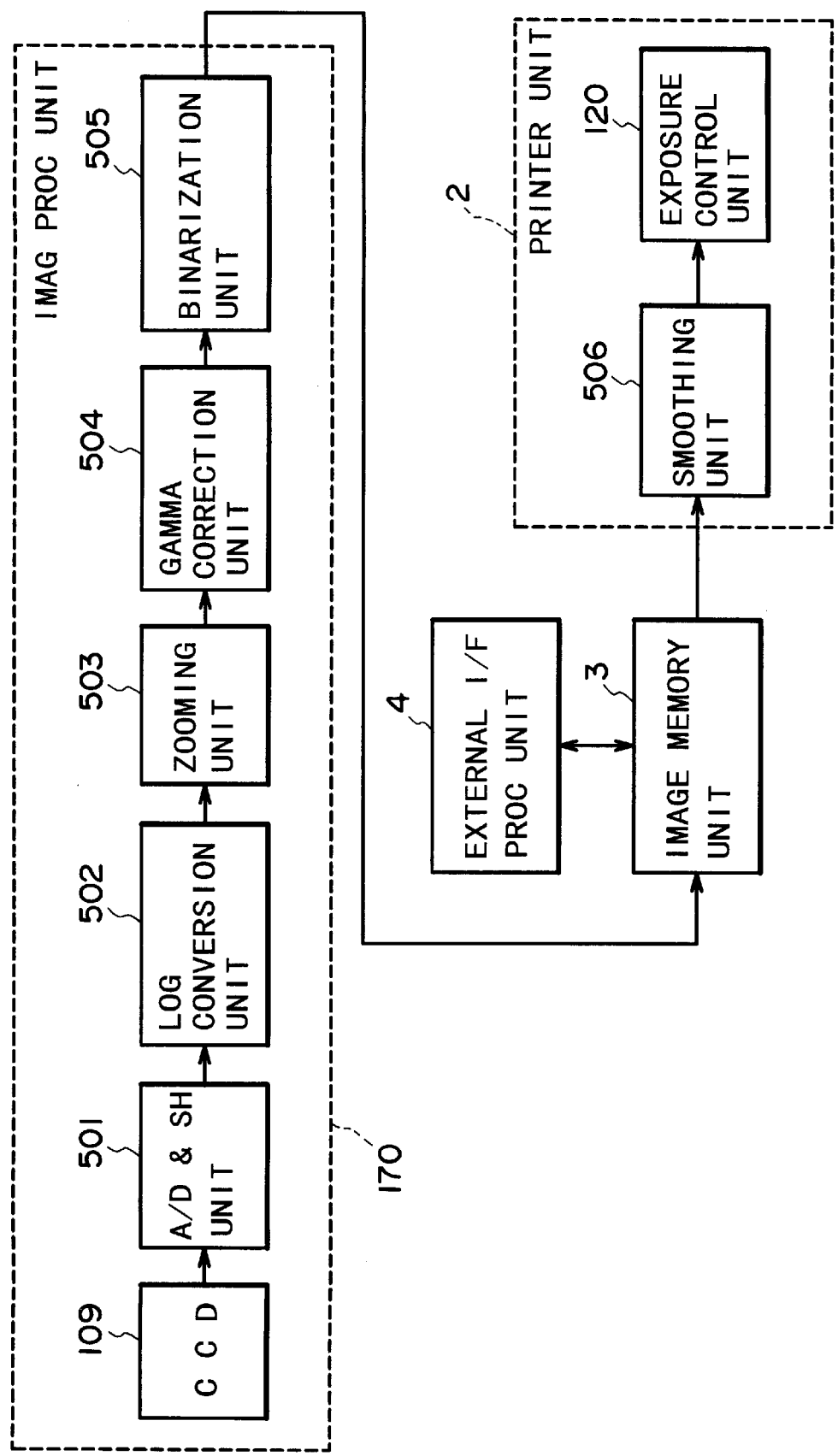
FIG. 3 is a block diagram showing a detailed structure of an image process unit in the apparatus.

In the image process unit 170 of FIG. 3, initially, the original image obtained by the CCD sensor 109 through the lens 108 (FIG. 1) is input as luminance data of black and then converted into the analog electrical signal by the sensor 109. The converted electrical signal is input to a not-shown analog signal process unit to be subjected to a sample-and-hold process, a dark level correction and the like. Then, in an analog-to-digital conversion and shading correction (A/D SH) unit 501, the processed electrical signal is A/D converted and an obtained digital image signal is shading-corrected. Namely, in such a shading correction, dispersion of the original reading sensors and light distribution characteristic of an original illumination lamp are corrected.

Then, the shading-corrected signal is sent to a logarithmic (LOG) conversion unit 502. Since a logical unit for converting the input luminance data into density data is provided in the unit 502, this logical unit converts the luminance data into the density data by outputting a table value corresponding to the input data. After then, a zooming unit 503 zooms the image represented by the density data at desired magnification, and the zoomed image is input to a gamma correction unit 504. In the unit 504, in a case where the density data is output, the input data is converted by using a logical unit in consideration of a printer characteristic, thereby performing output adjustment according to a density value set by the operation unit 172.

Then, the density data is sent to a binarization unit 505. In the unit 505, since the multivalue density data is binarized, an amount of the image data to be stored in the memory becomes small.

However, if the image is binarized, the number of gradations is changed from "256" to "2". Thus, if the image data such as photographic image data containing a large number of halftones is binarized, generally, since the binarized image is remarkably deteriorated, pseudo halftone expression based on the binary data is necessary. In the embodiment, an error diffusion method is used as a method to perform the pseudo halftone expression based on the binary data. In this method, if a density of one image is larger than a threshold, the data representing this image is considered as "255" density data, while if the density is equal to or lower than the threshold, the data is considered as "0" density data, and then the obtained density data is binarized. Then, a difference between the actual density data and the binarized data is diffused to peripheral pixels as an error signal. The error diffusion in this method is performed by multiplying a weighting coefficient on a previously prepared matrix and an error in the binarization together, and then adding a multiplied result to the peripheral pixel. Thus, an average density value can be preserved throughout the image, so that the pseudo halftone can be expressed in binary.

The binarized image data is sent to the image memory unit 3 and stored therein. Since image data input from the external computer through the external interface process unit 4 has been processed as binary image data in the unit 4, such the processed data is sent to the memory unit 3 as it is.

The image memory unit 3 has a high-speed page memory and a large-capacity memory (i.e., hard disk) capable of storing the image data of plural pages, as described later. The image data of plural print jobs stored in the hard disk is output in the order according to an edit mode designated at the operation unit 172. For example, if the sorting is designated, the images of a sheaf of the originals carried from the DF 180 are output in the reading order. That is, the image data of the originals once stored in the hard disk is read, this reading is repeated plural times, and the obtained data is output. Thus, the image memory unit can act as a sorter having plural bins. The image data output from the image memory unit 3 is sent to a smoothing unit 506 in a control part of a printer unit 2 composed of the exposure control unit 120, the image formation unit 126, the fixing unit 141 and the like. In the smoothing unit 506, the data is interpolated to smooth a leading edge of the binarized image, and the obtained data is output to the exposure control unit 120. The unit 120 performs the above exposure scanning. In addition, the image formation unit 126 and the fixing unit 141 respectively perform the above processes, whereby the image based on the image data is formed on the transfer paper sheet.

Structure of Image Memory Unit

In the following section, the detailed structure of the image memory unit 3 will be explained with reference to the block diagram shown in FIG. 4.

Figure 4:
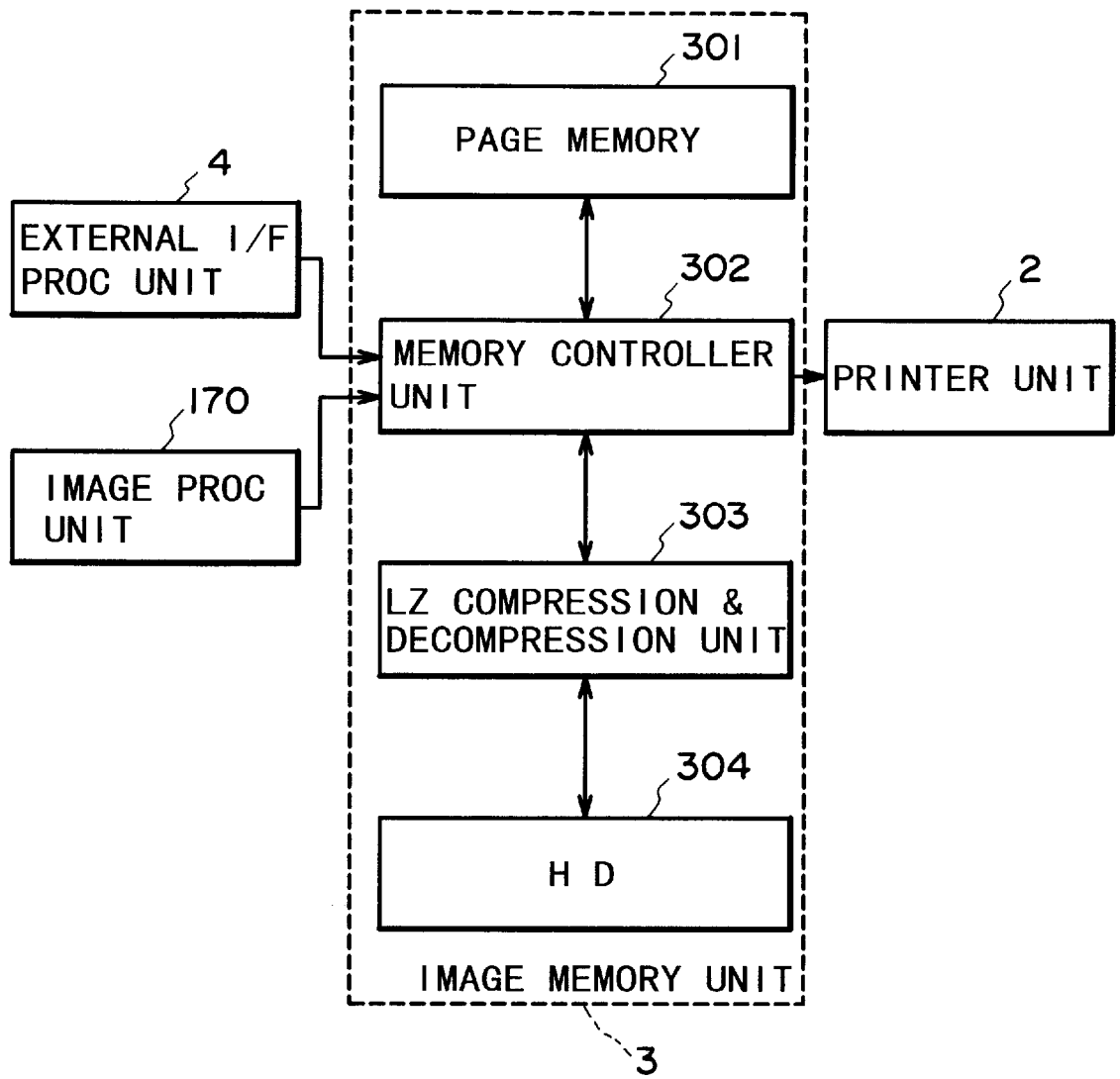
FIG. 4 is a block diagram showing a detailed structure of an image memory unit in the apparatus.

In FIG. 4, the image memory unit 3 writes the binary image data sent from the external interface process unit 4 and the image process unit 170 into a page memory 301 composed of a memory such as a DRAM and the like through a memory controller unit 302, reads and sends the image data to the printer unit 2, and accesses image data input/output to/from a hard disk 304 being a large-capacity memory. The memory controller unit 302 generates a DRAM refresh signal to the page memory 301, and adjusts the accessing from the external interface process unit 4, the image process unit 170 and the hard disk 304 to the page memory 301. Further, the unit 302 controls writing/reading addresses to/from the page memory 301, a reading direction and the like according to an instruction from the CPU 171. Thus, the CPU 171 controls a function to form a layout of the plural original images in the page memory 301 and sequentially output the image data to the printer unit 2, a function to cut out and output only a part of the image, and a function to rotate the image. In case of writing/reading the image data to/from the hard disk 304, the image data is compressed and depressed (or expanded) by an LZ compression and depression unit 303.

Structure of External Interface Process Unit

In the following section, the detailed structure of the external interface process unit 4 will be explained with reference to the block diagram shown in FIG. 5.

Figure 5:
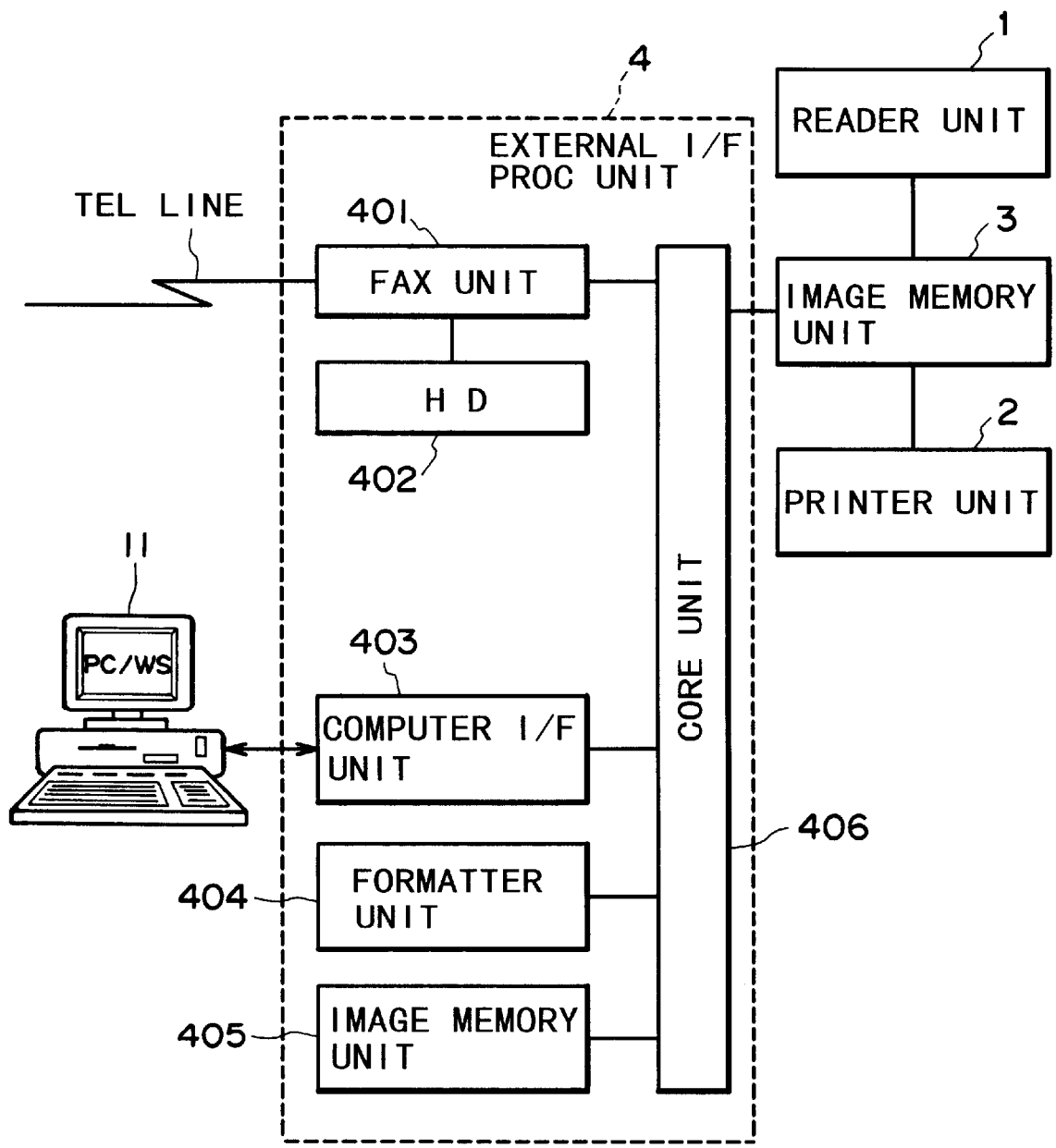
FIG. 5 is a block diagram showing a detailed structure of an external interface process unit in the apparatus.

In FIG. 5, numeral 1 denotes a reader unit which is composed of the units 101 to 109 shown in FIG. 1 and the image process unit 170 shown in FIG. 3. The external interface process unit 4 receives the binary image data from the reader unit 1 through the image memory unit 3, and outputs binary image data from the unit 4 to the printer unit 2 through the image memory unit 3, thereby performing the image formation.

The external interface process unit 4 is composed of a core unit 406, a facsimile unit 401, a hard disk 402 for storing communication image data of the unit 401, a computer interface unit 403 connected to an external computer (PC/WS) 11, a formatter unit 404, and an image memory unit 405.

The facsimile unit 401, which is connected to a public line (TEL LINE) through a not-shown modem, receives/transmits facsimile communication data from/to the public line. The facsimile unit 401 stores the image for facsimile communication in the hard disk 402, and then executes the facsimile function. For example, the unit 401 performs facsimile transmission at a designated time, or transmits the image data according to a partner's inquiry based on a designated password. By this facsimile function, after the image data is once transferred from the reader unit 1 to the facsimile unit 401 or the hard disk 402 through the image memory unit 3, it becomes possible to perform the facsimile transmission without using the units 1 and 3 to execute the facsimile function.

The computer interface unit 403 which performs data communication with the external computer 11 contains a LAN (local area network) interface, a serial interface, a SCSI (small computer system interface), a Centronics interface for inputting printer data, and the like. Through these interfaces, states of the printer unit 2 and the reader unit 1 are notified to the external computer, the image read by the reader unit 1 according to an instruction from the external computer is transferred to this external computer, and print image data is received from the external computer.

Since the print image data notified from the external computer through the computer interface unit 403 has been described by dedicated printer codes, the formatter unit 404 converts the printer codes into raster image data which is used to perform the image formation by the printer unit 2 through the image memory unit 3. In this case, the formatter unit 404 expands or compresses the raster image data in the image memory unit 405. As above, the image memory unit 405 is used as the memory in which the formatter unit 404 expands the raster image data. Also, in a case where the image data from the reader unit 1 is sent to the external computer through the unit 403 (i.e., executing image scanner function), the image memory unit 405 is used when the image data sent from the unit 3 is once expanded to convert its data format into that suitable for the external computer and the obtained data is then sent from the unit 403.

The core unit 406 manages and controls data transfer among the facsimile unit 401, the computer interface unit 403, the formatter unit 404, the image memory unit 405 and the image memory unit 3. Thus, even if the external interface process unit 4 has plural image output units, or even if there is only one image transfer path to the image memory unit 3, the data is subjected to exclusive control and priority control to perform the image output under the management of the core unit 406.

Configuration of Operation Unit

In the following section, the detailed configuration of the operation unit to perform various settings of the image formation apparatus will be explained with reference to FIG. 6.

Figure 6:
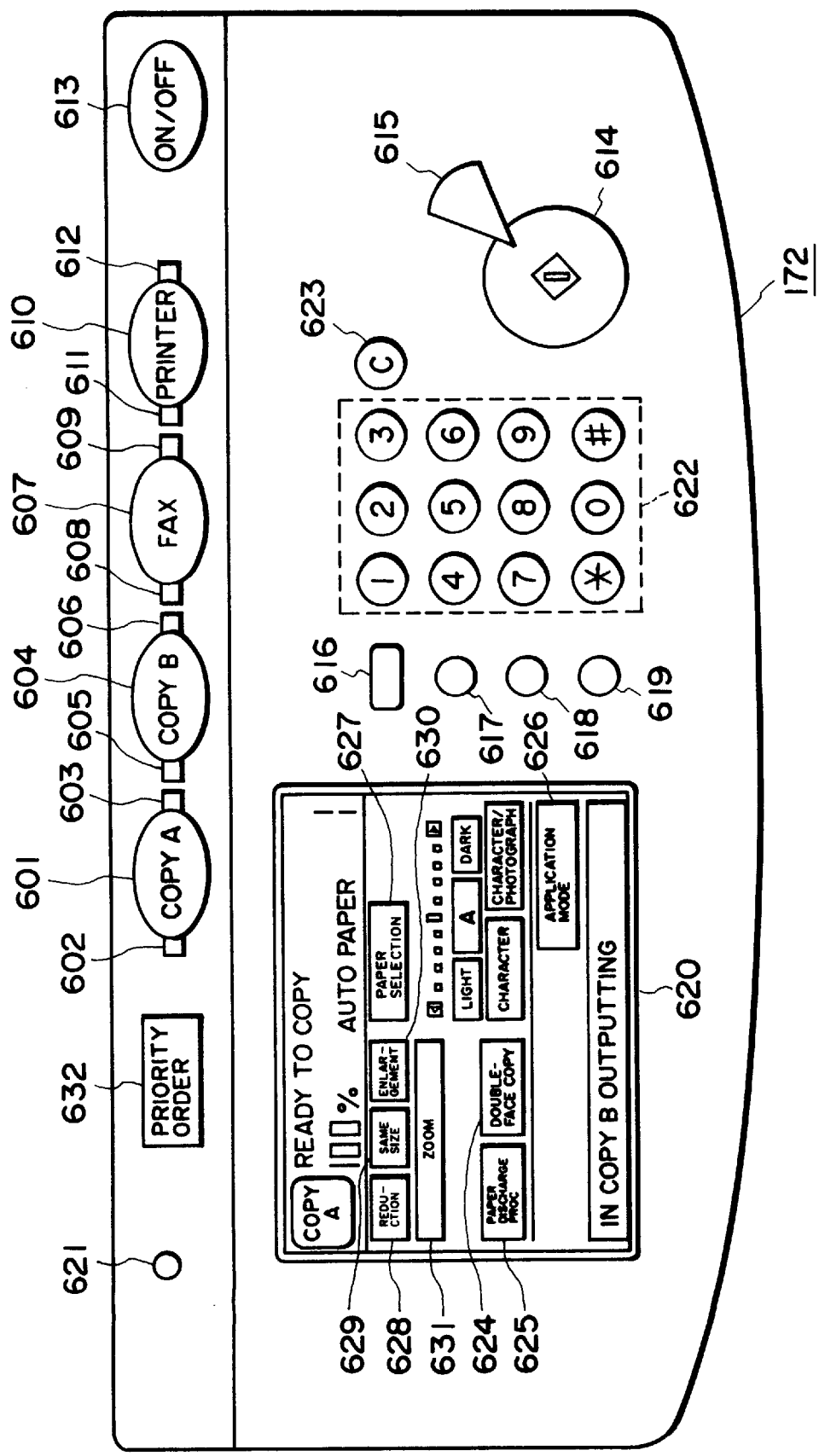
FIG. 6 is a view showing a detailed configuration of an operation unit in the apparatus.

In the operation unit 172 of FIG. 6, numeral 621 denotes a power lamp indicating a power supply state. That is, the lamp 621 is turned on/off according to power ON/OFF by a power switch 613.

Numeral 622 denotes a ten key used to set the number of image formation operations (i.e., copy operations) and input numerals necessary in setting the mode. Also, in a facsimile setting screen, the ten key 622 is used to input telephone numbers.

Numeral 623 denotes a clear key used to clear the setting input by the ten key 622.

Numeral 616 denotes a reset key used to return the set number of image formation operations, the set operation mode, a selected paper feed berth and the like to their default values.

Numeral 614 denotes a start key. When the start key 614 is depressed, the image formation operation starts. Not-shown red and green LEDs are provided at the center of the key 614. When it is impossible to start the image formation operation, the red LED is ON (i.e., lighted). On the other hand, when it is possible to start the operation, the green LED is ON.

Numeral 615 denotes a stop key used to stop a copy operation.

Numeral 617 denotes a guide key. When some key is depressed after the guide key 617 is depressed, a display panel displays guidance of the function capable of being set by that key. Then, when the key 617 is again depressed, the displayed guidance can be released.

Numeral 618 denotes a user setting key. By depressing this key 618, the used can change various settings of the image formation apparatus. For example, the user can change the setting of a period of time extending until the setting is automatically cleared, and the setting of the default value in the mode at the time of reset key depression.

Numeral 619 denotes an interruption key. When the key 619 is depressed during the image formation operation, execution of other image formation operation is interrupted. Instead, a copy operation can be executed without using the DF 180.

Numeral 620 denotes a display panel having a liquid crystal display and the like. The displayed contents of the panel 620 are changed according to the setting mode, in order to make the detailed mode setting easy. Touch sensors are provided on a surface of the panel 620. For example, FIG. 6 shows the setting screen of a copy operation mode, and keys 624 to 631 are displayed on the panel 620. Thus, by touching a position at which the specific key is displayed on the panel 620, the key is judged to be depressed for the mode setting.

Numeral 627 denotes the paper selection key used to select a paper berth. When the key 627 is depressed, the panel 620 displays a screen used to set which of the cassettes 131 and 132 the paper sheet is to be fed from.

Numerals 628 to 631 denote the magnification setting keys in the copy operation.

Figure 7:
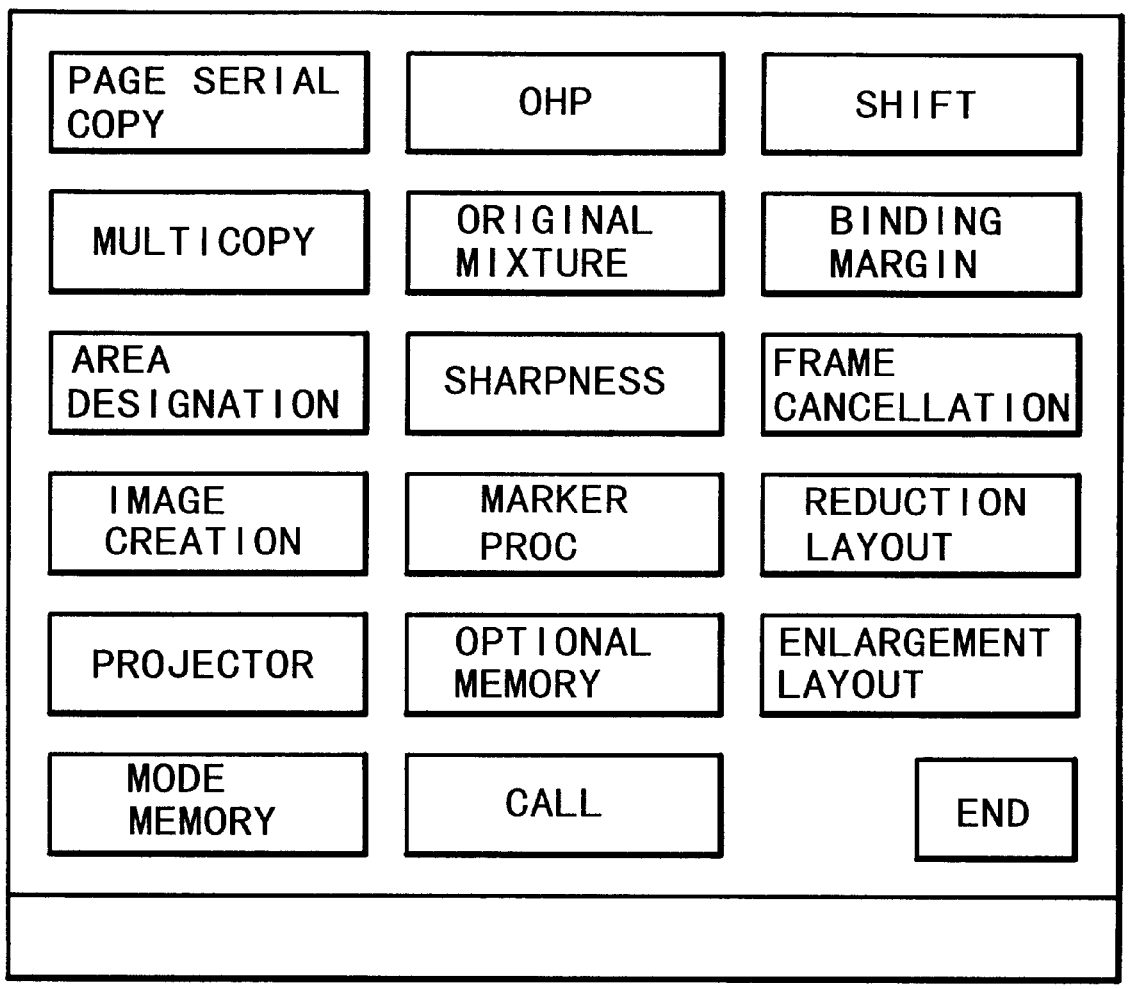
FIG. 7 is a view for explaining an example of a setting screen on a display panel of the operation unit used in a copy operation application mode.

Numeral 626 denotes the application mode setting key. When the key 626 is depressed, the panel 620 displays a screen used to set application function modes such as a multicopy operation mode, a reduction layout mode, a cover sheet synthesis mode and the like. For example, the panel 620 displays such the application mode selection screen as shown in FIG. 7 to enable various application mode setting.

Further, in FIG. 6, numeral 624 denotes the double-face operation setting key. For example, by using the key 624, it is possible to set three kinds of double-face modes, i.e., "single-double mode" to perform double-face output from a single-face original, "double-double mode" to perform the double-face output from a double-face original and "double-single mode" to perform two single-face output from the double-face original.

Numeral 625 denotes the paper discharge process setting key. By depressing the key 625, it is possible to set the operation mode as to whether or not the above sorting and/or stapling are to be performed in the paper discharge process unit 190. In this case, the setting is performed to a copy job. However, it is obviously understood that, even if a print job is instructed from the external computer, various settings including the setting as to whether or not the sorting and/or stapling are to be performed are performed on the setting screen of a monitor based on application programs to demand the print job from the external computer.

The display panel 620 ordinarily displays the various keys with solid lines. However, in a case where the mode corresponding to the displayed key can not be set, the panel 620 displays the key with dotted lines (or meshed lines) to indicate that the displayed key is inoperable. Further, in FIG. 6, the upper area of the panel 620 displays, e.g., the setting contents of the copy job and a current operation state. That is, the upper left area of the panel 620 displays that the currently displayed screen corresponds to which of later-described function modes. In the drawing, the setting screen for "copy A" is displayed. Although the job is displayed by using characters in this case, a symbol or the like may be used. The lower area of the panel 620 displays an operation state a of later-described other function mode within a range capable of being displayed by one line. In FIG. 6, this area displays that an output operation to the printer unit is being performed in a copy B job.

Figure 8A:
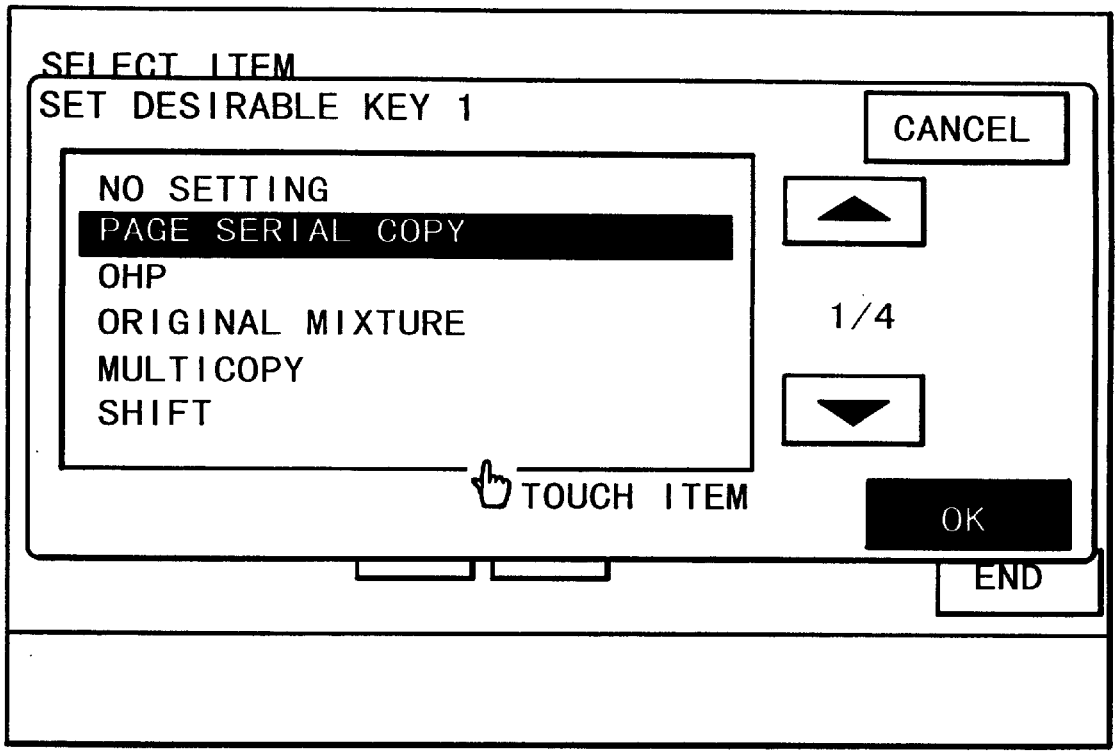
FIG. 8A is a view for explaining an example of a desirable key setting screen on the display panel used in the copy operation application mode.
Figure 8B:
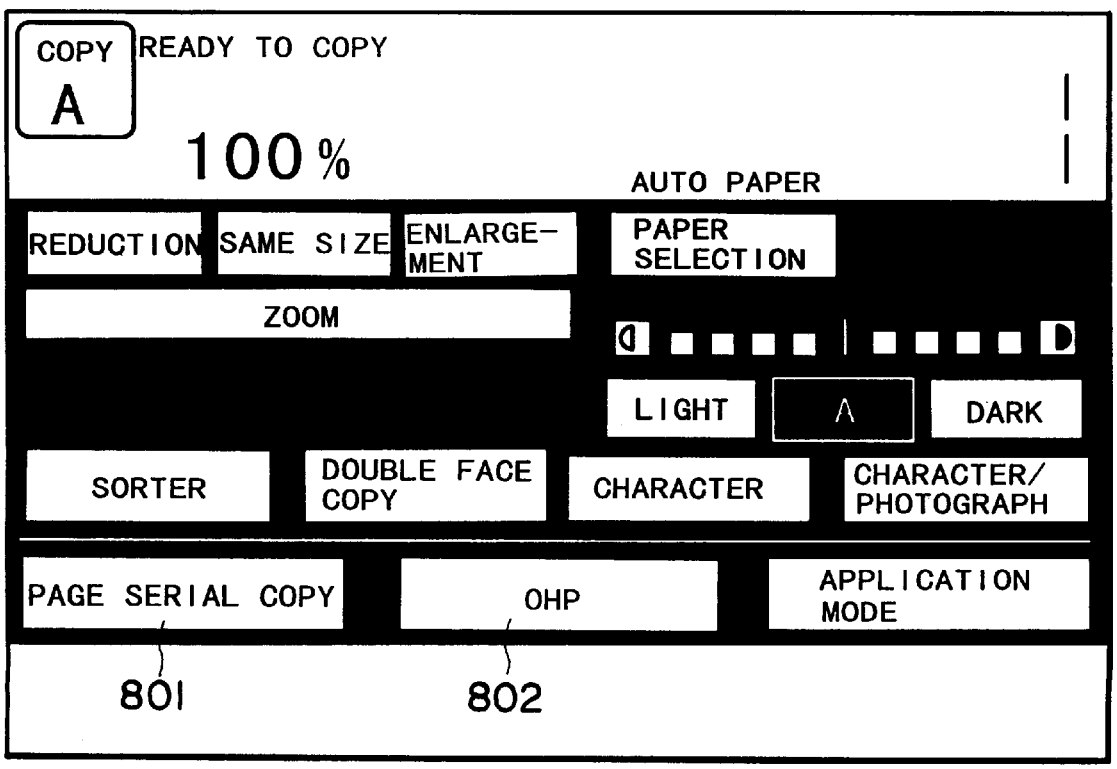
FIG. 8B is a view for explaining an example the screen after the setting is performed by using the desirable key.

Further, desirable keys of which contents are changeable by the user are provided on the side of the application mode key 626 on the panel 620. The two kinds of keys to execute the functions also capable of being set on the application mode setting screen can be maximally registered as the desirable keys by using a setting screen as shown in FIG. 8A. Further, by displaying the application mode setting keys as the desirable keys at positions 801 and 802 shown in FIG. 6, it is possible to easily set the modes by using the desirable keys 801 and 802.

Furthermore, in FIG. 6, numerals 601, 604, 607 and 610 denote keys to change the displayed state on the operation unit, and numerals 602, 603, 605, 606, 608, 609, 611 and 612 denote LEDs to display the changed states.

That is, numerals 601, 604, 607 and 610 denote the keys to respectively change the copy A, copy B, facsimile and printer functions. Each of these keys is made by a semi-transparent key button and contains a display lamp such as a not-shown LED or the like. When an operation screen is selected by depressing this key, the display lamp in the depressed key is turned on. That is, it is controlled that only the lamp in the key corresponding to the selected setting screen is ON and the lamps in the other keys are OFF.

The green LEDs 603, 606, 609 and 612 are arranged respectively on the right of the keys 601, 604, 607 and 610. Each LED is turned on to indicate the operation state of each function. For example, the LED 606 for the copy B job is controlled to be OFF while the copy B job is on standby. On the other hand, when an output operation in the copy B is being performed as in FIG. 6, the LED 606 is turned on and off repeatedly. Further, in a case where an image for the copy B job has been stored in the hard disk 304 of the image memory unit 3 but the print operation in the copy B job is not yet performed, the LED 606 is controlled to be ON. Similarly, for example, the LED 609 for the facsimile job is turned on and off repeatedly during a communication operation, a print operation and a reading operation. On the other hand, in a case where a facsimile image has been stored in the hard disk 402 connected to the facsimile unit 401, the LED 609 is controlled to be ON.

Further, the red LEDs 602, 605, 608 and 611 are arranged respectively on the left of the keys 601, 604, 607 and 610. Each LED is turned on to indicate that an abnormality has occurred in each function. For example, the LED 605 for the copy B job is turned on and off repeatedly when an abnormality such as paper-empty interruption, jam or the like occurs during the copy B operation. At this time, if the key 604 for the copy B job is depressed to change the displayed screen on the operation unit 172 to the copy B setting screen, the state of the copy B job is displayed on the display panel 620, whereby the operator can confirm the details of the abnormality.

Each of the keys 601, 604, 607 and 610 can be depressed at any time to change the displayed screen on the operation unit 172, irrespective of the operation states of the respective functions. In the first embodiment, it is possible to switch the copy A function and the copy B function, whereby the start key 614, the stop key 615, the reset key 616 and the like other than the keys displayed on the panel 620 are operative for the functions selected by the keys 601 and 604. For example, while the copy A operation screen is being displayed, if the stop key 615 is depressed, it is impossible to stop the output operation in the copy B job. That is, if it is intended to stop the copy B job, it is necessary to depress the stop key 615 after depressing the copy B function key 604. The data set by the user setting key 618 is effective in each of the copy A operation setting screen and the copy B operation setting screen, whereby it is possible to independently perform the setting operation in each screen.

Further, in FIG. 6, numeral 632 denotes a priority order setting key. When the key 632 is depressed, a not-shown setting screen for setting the output priority order of the copy, facsimile and printer print jobs is displayed on the display panel 620. Thus, the priority order of these jobs can be arbitrarily set by the setting operation on this screen. For example, in an initial state (i.e., default condition), the output priority order is set to be the order of copy, facsimile and printer print jobs. However, since there is no output priority order between the copy A and B jobs, the earlier-input job is preferentially output.

Explanation of Operation

Figure 9:
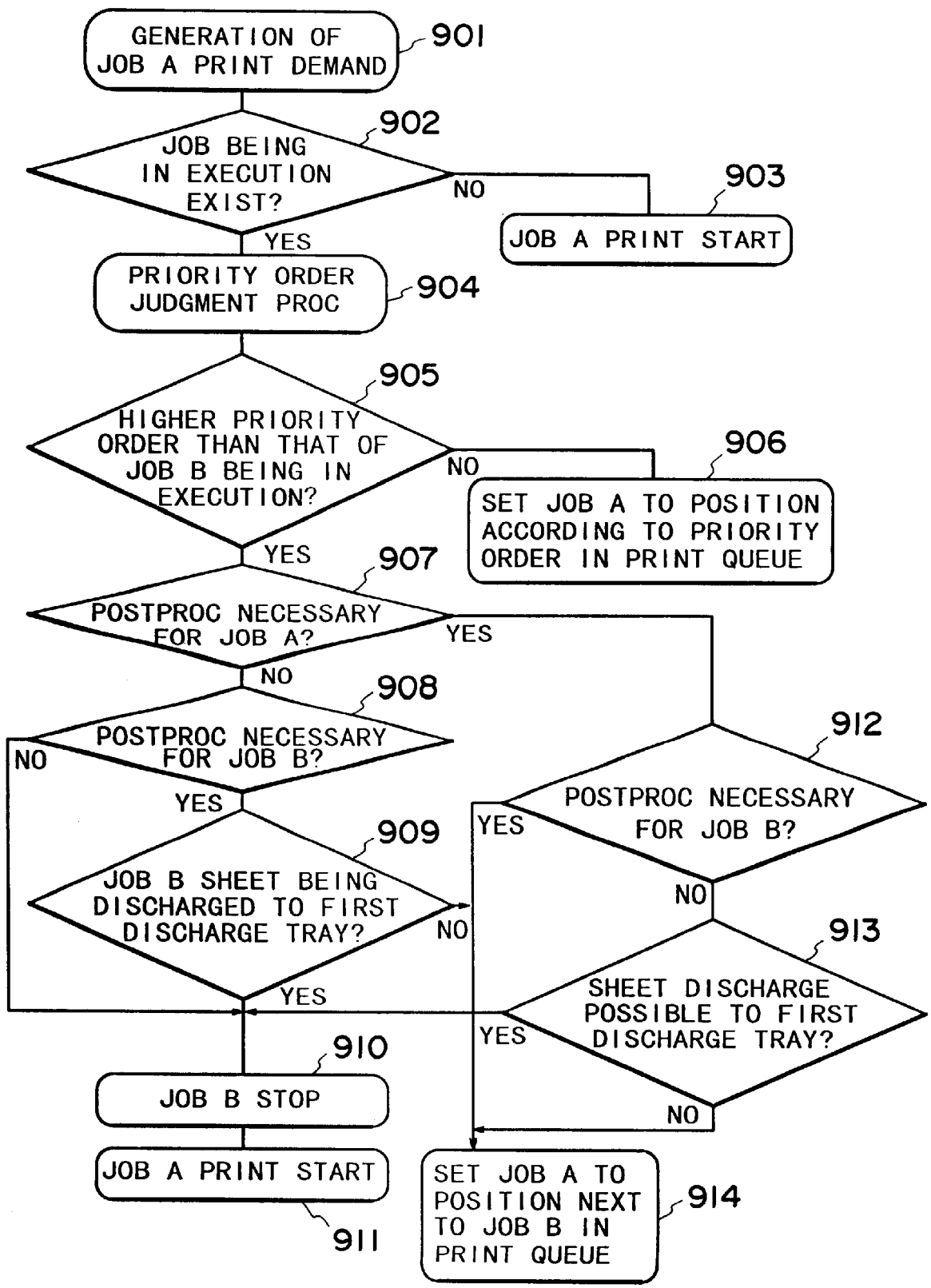
FIG. 9 is a flow chart showing a control process procedure in a case where a print demand of a new job A is issued.

Subsequently, the operation of the image formation apparatus according to the first embodiment will be explained. That is, the operation in a case where a print (i.e., image output) demand of a new print job is issued from the copy instruction operation of the operation unit 172, the facsimile reception or the print job reception from the external computer will be explained with reference to FIG. 9. FIG. 9 is the flow chart showing a control procedure by the CPU 171 which controls the entire apparatus in such a case.

In FIG. 9, if the print demand of the new print job (referred as job A hereinafter) is issued in a step 901, it is judged by the CPU 171 in a step 902 whether or not a print job (referred as job B hereinafter) in which the printing (i.e., image formation) is currently being performed exists. If judged that the job B does not exist, the image formation operation of the job A starts in a step 903.

On the other hand, if judged that the job B exists, a priority order judgment process is performed in a step 904. In the process, output priority order of the job B is compared with that of the job A.

Subsequently, based on a judged result of the step 904, it is further judged in a step 905 whether or not the priority order of the job B is higher than that of the job A. If judged that the priority order of the job B is higher than that of the job A, in a step 906, job execution order is registered in a data base which is formed in the RAM 175 and manages a print job queue. Concretely, in this step, the execution order is registered such that the job A is executed after the job B is executed. Thus, management data and image data of the job A are held and the job A is set to be in a print waiting state until the order of the job A comes around.

In this case, if another print job C already exists after the job B in the print job queue and the priority order of the job C is higher than that of the job A, the execution order is registered in the data base such that the job A is executed after the job C is executed.

On the other hand, if it is judged in the step 905 that the priority order of the job A is higher than that of the job B, it is further judged in step 907 and the following steps whether to perform an interruption operation stop the output of the job B and instead perform the output of the job A or to perform an operation to continue the output of the job B and thus perform the output of the job A after the job B terminates.

That is, it is initially judged in the step 907 whether the job A is a job which has been set to perform sorting and/or stapling (i.e., postprocess) or a job which has been set not to perform the postprocess. In other words, it is judged in the step 907 whether or not the job A is a job which uses the postprocess tray 193.

If judged in the step 907 that the job A has been set to perform the postprocess, later-described step 912 and following steps are performed.

On the other hand, if judged in the step 907 that the job A has been set not to perform the postprocess, then the flow advances to a step 908 to judge whether or not the currently executed job B is a job which has been set to perform the postprocess.

If judged in the step 908 that the job B has been set not to perform the postprocess, then the flow advances to a step 910 to stop the print output of the job B and then advances to a step 911 to start the print output of the job A, whereby the output of the job A of which the priority order is higher than that of the job B is performed in interruption.

On the other hand, if judged in the step 908 that the job B has been set to perform the postprocess, then the flow advances to a step 909 to judge whether the transfer paper sheet in the job B is discharged to the paper discharge tray 191 or to the paper discharge tray 192. As described above, if the job contains the postprocess, the sheet is controlled to be basically discharged to the tray 191 (first paper discharge tray). Therefore, when the sheet is discharged to the tray 192 (second paper discharge tray), it can be considered that the sheet had been already discharged to the tray 191.

If judged in the step 909 that the job B discharges the sheaf of transfer paper sheets to the second paper discharge tray 192, since it is impossible to stack only the sheets of the job A on the second tray 192, the flow advances to a step 914 to register in the data base of the RAM 175 that the job A is to be executed after the job B is executed and to hold both the management data and the image data of the job A until the output of the job B terminates. At the time of the step 914, if the other print job C already exists after the job B in the print job queue and the priority order of the job C is lower than that of the job A, the execution order is registered in the data base such that the job A is executed after the job B is executed (i.e., placing job A between jobs B and C).

On the other hand, if judged in the step 909 that the job B discharges the sheaf of sheets to the first paper discharge tray 191, the flow advances to the step 910 to stop the job B and then to the step 911 to start the printing of the job A, whereby the sheets are discharged to the second tray 192.

On the other hand, if judged in the step 907 that the job A contains the postprocess, the flow advances to the step 912 to judge whether or not the job B contains the postprocess. The case where the job B is judged in the step 912 to contain the postprocess means that both the jobs A and B contain the postprocess. In this case, if the output of the job A is performed in interruption, it obstructs the sorting and stapling of the output sheaves of both the jobs. Therefore, as described above, the step 914 is executed to register that the job A is to be executed after the job B is executed, in order to prevent such inconvenience.

On the other hand, if judged in the step 912 that the job B does not contain the postprocess, the flow advances to a step 913. As described above, if the job does not contain the postprocess, since the transfer paper sheet is discharged to the paper discharge tray 192 (second tray), the sheets of the job B are basically discharged to the second tray 192. Therefore, it is judged in the step 913 whether or not the first paper discharge tray 191 is not full up with the sheets and thus the sheaf of output sheets of the job A can be discharged to the tray 191. If judged that the sheaf can be discharged to the tray 191, since a paper discharge destination of the job A can be made different from that of the job B, the flow advances to the step 910 to stop the job B and then to the step 911 to start the printing of the job A, whereby the sheaf of sheets of the job A is discharged to the tray 191.

On the other hand, if judged in the step 913 that the sheaf of sheets of the job A can not be discharged to the first tray 191, the flow advances to the step 914 to register that the job A is to be executed after the job B is executed. This is because, since the job B is the output job to the second tray 192, if the job A is executed to discharge the output sheaf to the tray 192, the two output sheaves of the jobs A and B overlap on the tray 192, whereby these sheaves can not be adequately adjusted.

As described above, according to the first embodiment, in the case where the print demand of the job A is issued during print execution of the job B and the output priority order of the job A is higher than that of the job B, if both the jobs A and B contain the postprocess (sorting and/or stapling), the job B is continued and the job A is executed after the job B terminates. Therefore, the postprocess of both the job A and the job B can be performed without any obstacle.

Further, in the case where the job A does not contain the postprocess and the job B contains the postprocess, the job A is executed in interruption to discharge the sheets to the tray 192 on condition that the sheets of the job B are being discharged to the tray 191. By doing so, it is possible to prevent that the discharged sheets of the jobs A and B overlap on the tray 192. Further, even if the job B is reexecuted after the job A terminates, it is possible to prevent that the output sheaves of sheets of the job A get mixed in those of the job B.

Furthermore, in the case where the job A contains the postprocess and the job B does not contain the postprocess and discharges the sheets to the tray 192, the job A is executed in interruption to discharge the sheets to the tray 191 on condition that the tray 191 is not full up with the sheets and thus the sheets can be discharged thereto. By doing so, it is possible to prevent that the discharged sheaves of sheets of the jobs A and B overlap, and also prevent that the sheaves of sheets the job A get mixed in those of the job B.

Furthermore, in the case where both the jobs A and B do not contain the postprocess, the job A is executed in interruption. In this case, since both the jobs A and B discharge the sheets to the tray 192, the discharged sheaf of sheets of the job A is overlaid on that of the job B on the tray 192. However, even if such inconvenience occurs, the job A is forcedly executed in interruption since this case should attach importance to the priority order. In point of convenience of using the apparatus, the output priority order of the copy job is generally made higher than those of the facsimile job and printer job. For example, it is assumed that the job A is the copy job and the job B is the facsimile job or the print job demanded from the external computer. In such a case, when the copy job is executed, generally the user stands by the image formation apparatus and immediately picks up the discharged sheets of the job A. Therefore, even if the job B is reexecuted after the job A terminates, the output sheaf of sheets of the job A does not get mixed in those of the job B on the paper discharge tray 192, whereby any problem does not occur.

Second Embodiment

In the following section, the second embodiment of the present invention will be explained.

A mechanical structure of the second embodiment is slightly different from that of the first embodiment shown in FIG. 1. That is, in an image formation apparatus according to the second embodiment, a paper discharge tray 192 of a paper discharge process unit 190 is fixed to a paper discharge port positioned at an end of a feed path 194. Thus, since the tray 192 can not be moved to a paper discharge port positioned at an end of a process tray 193, it is impossible to stack a sheaf of sheets discharged from the tray 193 on the tray 192. That is, since a fill state of a paper discharge tray 191 may not be considered, the sheaf of sheets is always discharged to the tray 191 every time a postprocess (sorting and/or stapling) is performed. On the other hand, when the postprocess is not performed, the sheaf of sheets is discharged to the tray 192. Other structures of the second embodiment are identical with those of the first embodiment.

In the following section, an operation of the second embodiment will be explained. Concretely, the operation in a case where a print demand of a job A is issued will be explained with reference to a flow chart shown in FIG. 10.

Figure 10:
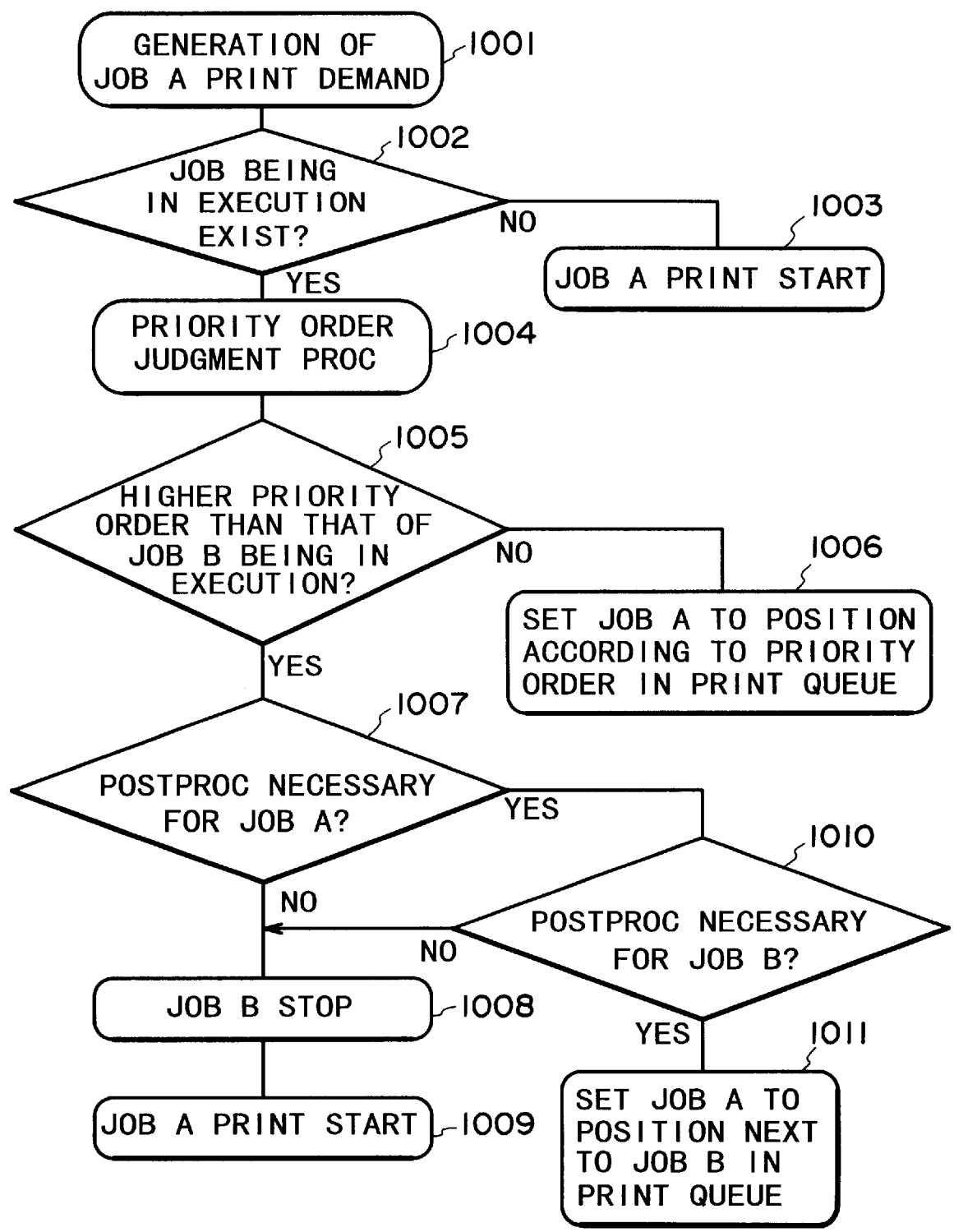
FIG. 10 is a flow chart showing a control process procedure in a case where a print demand of a job A is issued in a second embodiment of the present invention.

In FIG. 10, since operations of steps 1001 to 1007 are the same as those of the steps 901 to 907 (FIG. 9) in the first embodiment, detailed explanation thereof will be omitted.

In a case where print output of a job B is being performed at a time when the print demand of the job A is issued, and also in a case where the output priority order of the job A is higher than that of the job B, it is judged in the step 1007 whether or not the job A contains the postprocess (sorting and/or stapling). If judged that the job A does not contain the postprocess, the flow advances to a step 1008 to stop the print output of the job B and then advances to a step 1009 to start print output of the job A, whereby the print output of the job A of which the priority order is higher than that of the job B is performed in interruption. These operations are the same as those of the steps 910 and 911 in the first embodiment.

On the other hand, if judged in the step 1007 that the job A contains the postprocess, the flow advances to a step 1010 to judge whether or not the job B contains the postprocess. Then, if judged that the job B does not contain the postprocess, since paper discharge destinations of the jobs A and B are different from each other and thus no obstacle occurs in the postprocess, the flow advances to the step 1008 to stop the job B and then to the step 1009 to start the print output of the job A.

On the other hand, if judged in the step 1010 that the job B contains the postprocess, since the output sheaves of sheets of the jobs A and B overlap and thus an obstacle occurs in the postprocess, the flow advances to a step 1011 to execute the job A after the job B terminates. This operation is the same as that of the step 914 in the first embodiment.

As described above, according to the second embodiment, in the case where the print demand of the job A of which the priority order is higher than that of the job B is issued during print execution of the job B, if both the jobs A and B contain the sorting or the stapling (postprocess), the job B is continued and the job A is executed after the job B terminates in the same manner as in the first embodiment. Therefore, the postprocess of both the job A and the job B can be performed without any obstacle.

Further, in the case where the job A contains the postprocess and discharges the sheets to the paper discharge tray 191, the job B is stopped temporarily and the job A is executed in interruption on condition that the job B does not contain the postprocess and discharges the sheets to the paper discharge tray 192. Therefore, it is possible to prevent the discharged sheets of the jobs A and B from overlapping on the tray and the output sheaf of sheets of the job A from getting mixed in the sheaves of the job B.

Furthermore, in the case where the job A does not contain the postprocess and discharges the sheets to the tray 192, the job A is executed in interruption irrespective of whether or not the job B contains the postprocess. Therefore, in this case, if the job B does not contain the postprocess and discharges the sheets to the tray 192, the output sheaves of sheets of the jobs A and B overlap on the tray 192. However, since such a state is the same as that in the steps 908, 910 and 911 in the first embodiment, no problem occurs when the job A is considered as the copy job.

In the above-explained first and second embodiments, in the case where the print demand of the job A of which the priority order is higher than that of the job B is issued while the print output of the job B is being performed, and also in the case where the job A contains the postprocess, the job A is executed later or in interruption according as whether the job B contains the postprocess or whether the sheets can be discharged to the tray 191. However, the present invention is not limited to this. That is, in the case where the job A contains the postprocess, the job A may be unconditionally executed after the job B terminates irrespective of whether or not the job B contains the postprocess.

Further, the postprocess to be performed on the transfer paper sheet (or cut sheet) after the printing is not limited to the sorting and/or stapling. That is, pasting, punching and the like may be included in the postprocess.

What is claimed is:

1. An image formation apparatus comprising:

an image formation unit adapted to form an image on a sheet according to an inputted job;

a sheet process unit adapted to selectively perform a sheet process on a sheet on which the image has been formed by said image formation unit; and a control unit adapted to control, according to whether or not a sheet process by said sheet process unit is included in a first job in which said image forming unit forms an image and in a second job which is input after the first job is input, whether or not an interruption operation of the second job is to be permitted, the interruption operation comprising stopping execution of the first job in order to perform the second job instead, wherein said control unit permits the interruption operation of the second job if the sheet process is not included in at least one of the first job and the second job, and causes the second job to be executed after the first job is executed if the sheet process is included in the first job and the second job.

2. An apparatus according to claim 1, wherein said control unit causes the second job to be executed after the first job is executed in a case where a priority order of the second job is lower than a priority order of the first job.

3. An apparatus according to claim 2, wherein said control unit causes the second job to be executed after the first job is executed in a case where a priority order of the second job is lower than a priority order of the first job.

4. An image formation apparatus comprising:

an image formations unit adapted to form an image on a sheet according to an inputted job;

a sheet process unit adapted to selectively perform a sheet process on a sheet on which the image has been formed by said image formation unit; and a control unit adapted to control, according to whether or not a sheet process by said sheet process unit is included in a first job in which said image formation unit is forming the image and in a second job which is input after the first job is input, whether or not an interruption operation of the second job is to be permitted, the interruption operation comprising stopping execution of the first job in order to perform the second job instead, wherein the sheet is carried to said sheet process unit when the sheet process is included in a job, and the sheet is not carried to said sheet process unit but is discharged when the sheet process is not included in a job.

5. An image formation apparatus comprising:

an image formation unit adapted to form an image on a sheet according to an inputted job;

a sheet process unit adapted to selectively perform a sheet process on a sheet on which the image has been formed by said image formation unit; and a control unit adapted to control, according to whether or not a sheet process by said sheet process unit is included in a first job in which said image formation unit is forming the image and in a second job which is input after the first job is input, whether or not an interruption operation of the second job is to be permitted, the interruption operation comprising stopping execution of the first job in order to perform the second lob instead, wherein said control unit causes the sheet subjected to the sheet process to be discharged to a first stacking unit, and causes the sheet not subjected to the sheet process to be discharged to a second stacking unit.

6. An apparatus according to claim 5, wherein, in a case where the sheet process is included in the first job and the sheet process is not included in the second job, the interruption operation of the second job is permitted if the sheet is not discharged to the second stacking unit.

7. An apparatus according to claim 5, wherein, in a case where the sheet process is not included in the first job and the sheet process is included in the second job, the interruption operation of the second job is permitted if the sheet can be discharged to the first stacking unit.

8. An apparatus according to claim 5, wherein, in a case where the sheet process is not included in the first job and the sheet process is not included in the second job, the interruption operation of the second job is permitted irrespective of sheet stacking states of the first and second stacking units.

9. An apparatus according to claim 1, wherein the sheet process is one of a sheet sorting process and a sheet stapling process.

10. A control method of an image formation apparatus to which a sheet process apparatus is connected, the sheet process apparatus adapted to perform a sheet process on a sheet on which an image has been formed, said method comprising:

a formation step of forming an image on a sheet according to an inputted first job;

an input step of inputting a second job after the first job is input; and a control step of controlling, according to whether or not a sheet process by the sheet process apparatus is included in the first job and the second job, whether or not an interruption operation of the second job is to be permitted, the interruption operation comprising stopping execution of the first job in order to perform the second job instead, wherein said control step includes permitting the interruption operation of the second job if the sheet process is not included in at least one of the first job and the second job, and causing the second job to be executed after the first job is executed if the sheet process is included in the first job and the second job.

11. An image formation apparatus comprising:

an image formation unit adapted to form an image on a sheet according to an inputted job;

a sheet process unit adapted to selectively perform a sheet process on a sheet on which the image has been formed by said image formation unit; and a control unit adapted to control, according to whether or not a sheet process by said sheet process unit is included in a first job in which said image formation unit forms the image, whether or not interruption operation of a second job is to be permitted, the interruption operation comprising stopping execution of the first job in order to perform the second job instead, wherein the sheet is carried to said sheet process unit when the sheet process is included in the job, and the sheet is not carried to said sheet process unit but is discharged when the sheet process is not included in the job.

12. A control method of an image formation apparatus to which a sheet process apparatus is connected, the sheet process apparatus including a sheet process unit adapted to perform a sheet process on a sheet on which an image has been formed, said method comprising:

a formation step of forming an image on a sheet according to an inputted first job;

an input step of inputting a second job after the first job is input; and a control step of controlling, according to whether or not a sheet process by the sheet process unit is included in the first job, whether or not an interruption operation of the second job is to be permitted, the interruption operation comprising stopping execution of the first job in order to perform the second job instead, wherein the sheet is carried to the sheet process unit when the sheet process is included in the job, and the sheet is not carried to the sheet process unit but is discharged when the sheet process is not included in the job.

13. An image formation apparatus comprising:

an image formation unit adapted to form an image on a sheet according to an inputted job;

a sheet process unit adapted to selectively perform a sheet process on a sheet on which the image has been formed by said image formation unit; and a control unit adapted to control, according to whether or not a sheet process by said sheet process unit is included in a second job which is input after a first job is input, whether or not an interruption operation of the second job during image formation in the first job is to be permitted, the interruption operation comprising stopping execution of the first job in order to perform the second job instead, wherein the sheet is carried to said sheet process unit when the sheet process is included in the job, and the sheet is not carried to said sheet process unit but is discharged when the sheet process is not included in the job.

14. A control method of an image formation apparatus to which a sheet process apparatus is connected, the sheet process apparatus including a sheet process unit adapted to perform a sheet process on a sheet on which an image has been formed, said method comprising:

a formation step of forming an image on a sheet according to an inputted first job;

an input step of inputting a second job after the first job is input; and a control step of controlling, according to whether or not a sheet process by the sheet process unit is included in the second job, whether or not an interruption operation of the second job is to be permitted, the interruption operation comprising stopping execution of the first job in order to perform the second job instead, wherein the sheet is carried to the sheet process unit when the sheet process is included in the job, and the sheet is not carried to the sheet process unit but is discharged when the sheet process is not included in the job.

15. An apparatus according to claim 5, wherein said control unit causes the second job to be executed after the first job is executed in a case where a priority order of the second job is lower than a priority order of the first job.

16. A control method of an image formation apparatus to which a sheet process apparatus is connected, the sheet process apparatus including a sheet process unit adapted to perform a sheet process on a sheet on which an image has been formed, said method comprising:

a formation step of forming an image on a sheet according to an inputted first job;

an input step of inputting a second job after the first job is input; and a control step of controlling, according to whether or not a sheet process by the sheet process unit is included in the first job and the second job, whether or not an interruption operation of the second job is to be permitted, the interruption operation comprising stopping execution of the first job in order to perform the second job instead, wherein the sheet is carried to the sheet process unit when the sheet process is included in a job, and the sheet is not carried to the sheet process unit but is discharged when the sheet process is not included in a job.

17. A control method of an image formation apparatus to which a sheet process apparatus is connected, the sheet process apparatus adapted to perform a sheet process on a sheet on which an image has been formed, said method comprising:

a formation step of forming an image on a sheet according to an inputted first job;

an input step of inputting a second job after the first job is input; and a control step of controlling, according to whether or not a sheet process by the sheet process apparatus is included in the first job and the second job, whether or not an interruption operation of the second job is to be permitted, the interruption operation comprising stopping execution of the first job in order to perform the second job instead, wherein said control step causes a sheet subjected to the sheet process to be discharged to a first stacking unit, and causes a sheet not subjected to the sheet process to be discharged to a second stacking unit.

18. A method according to claim 17, wherein, in a case where the sheet process is included in the first job and the sheet process is not included in the second job, the interruption operation of the second job is permitted if the sheet is not discharged to the second stacking unit.

19. A method according to claim 17, wherein, in a case where the sheet process is not included in the first job and the sheet process is included in the second job, the interruption operation of the second job is permitted if the sheet can be discharged to the first stacking unit.

20. A method according to claim 17, wherein, in a case where the sheet process is not included in the first job and the sheet process is not included in the second job, the interruption operation of the second job is permitted irrespective of sheet stacking states of the first and second stacking units.

21. A method according to claim 10, wherein said control step causes the second job to be executed after the first job is executed in a case where a priority order of the second job is lower than a priority order of the first job.

22. A method according to claim 16, wherein said control step causes the second job to be executed after the first job is executed in a case where a priority order of the second job is lower than a priority order of the first job.

23. A method according to claim 17, wherein said control step causes the second job to be executed after the first job is executed in a case where a priority order of the second job is lower than a priority order of the first job.

24. An image formation apparatus comprising:
   an image formation unit adapted to form an image on a sheet according to as inputted job;
   a sheet process unit adapted to selectively perform a sheet process on a sheet on which the image has been formed by said image formation unit; and
   a control unit adapted to control, according to whether or not a sheet process by said sheet process unit is included in a first job in which said image formation unit forms the image, whether or not an interruption operation of a second job is to be permitted, the interruption operation comprising stopping execution of the first job in order to perform the second job instead,
   wherein said control unit causes the sheet subjected to the sheet process to be discharged to a first stacking unit, and causes the sheet not subjected to the sheet process to be discharged to a second stacking unit.

25. A control method of an image formation apparatus to which a sheet process apparatus is connected, the sheet process apparatus adapted to perform a sheet process on a sheet on which an image has been formed, said method comprising:
   a formation step of forming an image on a sheet according to an inputted first job;
   an input step of inputting a second job after the first job is input; and
   a control step of controlling, according to whether or not a sheet process by the sheet process apparatus is included in the first job, whether or not an interruption operation of the second job is to be permitted, the interruption operation comprising stopping execution of the first job in order to perform the second job instead,
   wherein said control step causes the sheet subjected to a sheet process to be discharged to a first stacking unit, and causes a sheet not subjected to the sheet process to be discharged to a second stacking unit.

26. An image formation apparatus comprising:
   an image formation unit adapted to form an image on a sheet according to an inputted job;
   a sheet process unit adapted to selectively perform a sheet process on a sheet on which the image has been formed by said image formation unit; and
   a control unit adapted to control, according to whether or not a sheet process by said sheet process unit is included in a second job which is input after a first job is input, whether or not an interruption operation of the second job during the image formation in the first job is to be permitted, the interruption operation comprising stopping execution of the first job in order to perform the second job instead,
   wherein said control unit causes the sheet subjected to the sheet process to be discharged to a first stacking unit, and causes the sheet not subjected to the sheet process to be discharged to a second stacking unit.

27. A control method of an image formation apparatus to which a sheet process apparatus is connected, the sheet process apparatus adapted to perform a sheet process on a sheet on which an image has been formed, said method comprising:
   a formation step of forming an image on the sheet according to an inputted first job;
   an input step of inputting a second job after the first job is input; and
   a control step of controlling, according to whether or not the sheet process by the sheet process apparatus is included in the second job, whether or not an interruption operation of the second job is to be permitted, the interruption operation comprising stopping execution of the first job in order to perform the second job instead,
   wherein said control step causes the sheet subjected to the sheet process to be discharged to a first stacking unit, and causes the sheet not subjected to the sheet process to be discharged to a second stacking unit.

28. An apparatus according to claim 1, wherein, in a case where the first job is a job in a copy mode, the second job is a job in a fax mode or a printer mode.

29. An apparatus according to claim 1, wherein, in a case where the first job is a job in a fax mode or a printer mode, the second job is a job in a copy mode.

30. A method according to claim 10, wherein, in a case where the first job is a job in a copy mode, the second job is a job in a fax mode or a printer mode.

31. A method according to claim 10, wherein, in a case where the first job is a job in a fax mode or a printer mode, the second job is a job in a copy mode.

32. An apparatus according to claim 4, wherein, in a case where the first job is a job an a copy mode, the second job is a job in a fax mode or a printer mode.

33. An apparatus according to claim 4, wherein, in a case where the first job is a job in a fax mode or a printer mode, the second job is a job in a copy mode.

34. An apparatus according to claim 11, wherein, in a case where the first job is a job in a copy mode, the second job is a job in a fax mode or a printer mode.

35. An apparatus according to claim 11, wherein, in a case where the first job is a job in a fax mode or a printer mode, the second job is a job in a copy mode.

36. A method according to claim 12, wherein, in a case where the first job is a job in a copy mode, the second job is a job in a fax mode or a printer mode.

37. A method according to claim 12, wherein, in a case where the first job is a job in a fax mode or a printer mode, the second job is a job in a copy mode.

38. An apparatus according to claim 13, wherein, in a case where the first job is a job in a copy mode, the second job is a job in a fax mode or a printer mode.

39. An apparatus according to claim 13, wherein, in a case where the first job is a job in a fax mode or a printer mode, the second job is a job in a copy mode.

40. A method according to claim 14, wherein, in a case where the first job is a job in a copy mode, the second job is a job In a fax mode or a printer mode.

41. A method according to claim 14, wherein, in a case where the first job is a job in a fax mode or a printer mode, the second job is a job in a copy mode.

42. A method according to claim 16, wherein, in a case where the first job is a job in a copy mode, the second job is a job in a fax mode or a printer mode.

43. A method according to claim 16, wherein, in a case where the first job is a job in a fax mode or a printer mode, the second job is a job in a copy mode.

44. A method according to claim 17, wherein, in a case where the first job is a job in a copy mode, the second job is a job in a fax mode or a printer mode.

45. A method according to claim 17, wherein, in a case where the first job is a job in a fax mode or a printer mode, the second job is a job in a copy mode.

46. An apparatus according to claim 24, wherein, in a case where the first job is a job in a copy mode, the second job is a job in a fax mode or a printer mode.

47. An apparatus according to claim 24, wherein, in a case where the first job is a job in a fax mode or a printer mode, the second job is a job in a copy mode.

48. A method according to claim 25, wherein, in a case where the first job is a job in a copy mode, the second job is a jab in a fax mode or a printer mode.

49. A method according to claim 25, wherein, in a case where the first job is a job in a fax mode or a printer mode, the second job is a job in a copy mode.

50. An apparatus according to claim 26, wherein, in a case where the first job is a job in a copy mode, the second job is a job in a fax mode or a printer mode.

51. An apparatus according to claim 26, wherein, in a case where the first job is a job is a fax mode or a printer made, the second job is a job in a copy mode.

52. A method according to claim 27, wherein, in a case where the first job is a job in a copy mode, the second job is a job in a fax mode or a printer mode.

53. A method according to claim 27, wherein, in a case where the first job is a job in a fax mode or a printer mode, the second job is a job in a copy mode.

54. An image formation apparatus that includes an image forming unit adapted to form an image on a sheet according to an inputted job, and which can be connected to a sheet process apparatus that includes a sheet process unit adapted to perform a sheet process on a sheet, said image formation apparatus comprising:
   a control unit adapted to control whether or not an interruption operation of a second job, input after a first job in which the image forming unit forms the image, is to be permitted,
   wherein said control unit permits interruption of the second job irrespective of whether the sheet process by the sheet process unit is included in the first job, if the sheet process by the sheet process unit is not included in the second job.

55. An apparatus according to claim 54, wherein said control unit permits interruption of the second job in a case where the sheet process is included in the second job and the sheet process is not included in the first job.

56. An apparatus according to claim 54, wherein said control unit does not permit interruption of the second job in a case where the sheet process is included in the second job and the sheet process is included in the first job.

57. An apparatus according to claim 54, wherein said control unit does not permit interruption of the second job in a case where a priority order of the second job is lower than a priority order of the first job.

58. An apparatus according to claim 54, wherein, in a case where the first job is a job in a copy mode, the second job is a job in a fax mode or a printer mode.

59. An apparatus according to claim 54, wherein, in a case where the first job is a job in a fax anode or a printer mode, the second job in a job in a copy mode.

60. A control method of an image formation apparatus that includes an image forming unit adapted to form an image on a sheet according to an inputted job, and which can be connected to a sheet process apparatus that includes a sheet process unit adapted to perform a sheet process on the sheet, said method comprising:
   a control step of controlling whether or not an interruption operation of a second job, input after a first job in which the image forming unit forms the image, is to be permitted,
   wherein said control step includes permitting interruption of the second job irrespective of whether the sheet process by the sheet process unit is included in the first job, if the sheet process by the sheet process unit is not included in the second job.

61. A method according to claim 60, wherein said control step includes permitting interruption of the second job in a case where the sheet process is included in the second job and the sheet process is not included in the first job.

62. A method according to claim 60, wherein said control step includes not permitting interruption of the second job in a case where the sheet process is included in the second job and the sheet process is included in the first job.

63. A method according to claim 60, wherein said control step includes not permitting interruption of the second job in a case where a priority order of the second job is lower than a priority order of the first job.

64. A method according to claim 60, wherein, in a case where the first job is a job in a copy mode, the second job is a job in a fax mode or a printer mode.

65. A method according to claim 60, wherein, in a case where the first job is a job in a fax mode or a printer mode, the second job is a job in a copy mode.

66. An image formation apparatus that includes an image forming unit adapted to form an image on a sheet according to an inputted job, and which can be connected to a sheet process apparatus that includes a plurality of stacking units adapted to stack sheets discharged from said image formation apparatus, said image formation apparatus comprising:
   a control unit adapted to control whether or not an interruption operation of a second job, input after a first job in which the image forming unit forms the image, is to be permitted,
   wherein said control unit permits interruption of the second job if the sheet can be discharged to a stacking unit other than a stacking unit being used in the first job.

67. An apparatus according to claim 66, wherein
   the sheet process apparatus includes a sheet process unit adapted to perform a sheet process on a sheet discharged from said image formation apparatus, and
   said control unit causes the sheet process unit to discharge the sheet to a first stacking unit of the plurality of stacking units.

68. An apparatus according to claim 67, wherein, in a case where the stacking unit being used in the first job is a stacking unit other than the first stacking means, said control unit permits interruption of the second job if the sheet can be discharged to the first stacking unit.

69. An apparatus according to claim 67, wherein, in a case where the stacking unit being used in the first job is the first stacking unit, said control unit permits interruption of the second job if the sheet can be discharged to a stacking unit other than the first stacking unit.

70. An apparatus according to claim 67, wherein, in a case where the stacking unit being used in the first job is a stacking unit other than the first stacking means, said control unit permits interruption of the second job irrespective of whether or not the sheet can be discharged to the first stacking unit.

71. An apparatus according to claim 67, wherein, in a case where the stacking unit being used in the first job is the first stacking unit, said control unit does not permit interruption of the second job if the sheet cannot be discharged to a stacking unit other than the first stacking unit.

72. An apparatus according to claim 66, wherein said control unit does not permit interruption of the second job in a case where a priority order of the second job is lower than a priority order of the first job.

73. An apparatus according to claim 66, wherein, in a case where the first job is a job in a copy mode, the second job is a job in a fax mode or a printer mode.

74. An apparatus according to claim 66, wherein, in a case where the first job is a job in a fax mode or a printer mode, the second job is a job ill a copy mode.

75. A control method of an image formation apparatus that includes an image forming unit adapted to form an image on a sheet according to an inputted job and which can be connected to a sheet process apparatus that includes a plurality of stacking units adapted to stack sheets discharged from the image formation apparatus, said method comprising:

a control step of controlling whether or not an interruption operation of a second job, inputted after a first job in which the image forming unit forms the image, is to be permitted, wherein said control step includes permitting interruption of the second job if the sheet can be discharged to a stacking unit other than a stacking unit being used in the first job.

76. A method according to claim 75, wherein the sheet process apparatus includes a sheet process unit adapted to perform a sheet process on the sheet discharged from the image formation apparatus, and said control step includes causing the sheet process unit to discharge a sheet to a first stacking unit of the plurality of stacking units.

77. A method according to claim 76, wherein, in a case where the stacking unit being used in the first job is a stacking unit other than the first stacking unit, said control step includes permitting interruption of the second job if the sheet can be discharged to the first stacking unit.

78. A method according to claim 76, wherein, in a case where the stacking unit being used in the first job is the first stacking unit, said control step includes permitting interruption of the second job if the sheet can be discharged to a stacking unit other than the first stacking unit.

79. A method according to claim 76, wherein, in a case where the stacking unit being used in the first job is a stacking unit other than the first stacking unit, said control step includes permitting interruption of the second job irrespective of whether or not the sheet can be discharged to the first stacking unit.

80. A method according to claim 76, wherein, in a case where the stacking unit being used in the first job is the first stacking unit, said control step includes not permitting interruption of the second job if the sheet cannot be discharged to a stacking unit other than the first stacking unit.

81. A method according to claim 75, wherein said control step includes not permitting interruption of the second job in a case where a priority order of the second job is lower than a priority order of the first job.

82. A method according to claim 75, wherein, in a case where the first job is a job in a copy mode, the second job is a jab in a fax mode or a printer mode.

83. A method according to claim 75, wherein, in a case where the first job is a job in a fax mode or a printer erode, the second job is a job in a copy mode.

* * * * *

UNITED STATES PATENT AND TRADEMARK OFFICE
CERTIFICATE OF CORRECTION

PATENT NO. : 6,219,502 B1
DATED : April 17, 2001
INVENTOR(S) : Yoshihito Osari et al.

It is certified that error appears in the above-identified patent and that said Letters Patent is hereby corrected as shown below:

Title page,
Item [56] References Cited, U.S PATENT DOCUMENTS,
"Steinmetx" should read -- Steinmetz et al. --; and
"Steinmetz et al." should read -- McKinlay --.

Item [57] ABSTRACT,
Line 2, "job," should read -- jobs --;
Line 5, "as" should read -- to --; and
Line 13, "page" should read -- pages --.

Column 1,
Line 15, "technique" should read -- techniques --;
Line 26, "such" should be deleted; and
Line 38, "a" (first occurrence) should read -- an --.

Column 2,
Line 2, "a" should read -- the --; and
Line 55, "example" should read -- example of --.

Column 3,
Line 47, "preexposure" should read -- pre-exposure --;
Line 57, "On the other hand," should read -- Further, --; and
Line 65, "preexposure" should read -- pre-exposure --.

Column 4,
Line 30, "subjected" should read -- subjected to --; and
Line 37, "of" should read -- of the --.

Column 5,
Line 33, "an" should read -- a --; and
Line 56, "(A/D" should read -- (A/D & --.

Column 6,
Line 37, "such" should be deleted.

Column 8,
Line 56, "used" should read -- user --; and
Line 63, "operation" should read -- operations --.

UNITED STATES PATENT AND TRADEMARK OFFICE
CERTIFICATE OF CORRECTION

PATENT NO. : 6,219,502 B1
DATED : April 17, 2001
INVENTOR(S) : Yoshihito Osari et al.

It is certified that error appears in the above-identified patent and that said Letters Patent is hereby corrected as shown below:

Column 9,
Line 20, "such" should be deleted;
Line 21, "setting." should read -- settings. --;
Line 34, "to" should read -- on --; and
Line 54, "a of" should read -- of a --.

Column 10,
Line 19, "B" should read -- B job --.

Column 11,
Line 5, "Subsequently," should read -- In the following section, --;
Lines 14 and 16, "(referred" should read -- (referred to --;
Line 22, "process," should read -- process, the --; and
Line 43, "operation" should read -- operation (referred to as interrupting hereinafter) to --.

Column 13,
Line 19, "full" should read -- filled --; and "the" (second occurrence) should be deleted; and
Line 44, "any" should read -- no --; "does not" should be deleted; and "occur." should read -- occurs. --.

Column 15,
Line 2, "as" should read -- to --;
Line 22, "forming" should read -- formation --; and
Line 45, "formations" should read -- formation --.

Column 16,
Line 12, "lob" should read -- job --.

Column 17,
Line 1, "not" should read -- not an --.

Column 19,
Line 10, "as" should read -- an --.

Column 20,
Line 31, "an" should read -- in --; and
Line 55, "In" should read -- in --.

UNITED STATES PATENT AND TRADEMARK OFFICE
CERTIFICATE OF CORRECTION

PATENT NO. : 6,219,502 B1
DATED : April 17, 2001
INVENTOR(S) : Yoshihito Osari et al.

It is certified that error appears in the above-identified patent and that said Letters Patent is hereby corrected as shown below:

Column 21,
Line 11, "jab" should read -- job --;
Line 19, "is" (second occurrence) should read -- in --; and "made" should read -- mode --;
Line 56, "anode" should read -- mode --; and
Line 57, "in" (first occurrence) should read -- is --.

Column 22,
Lines 45 and 55, "means," should read -- unit, --.

Column 23,
Line 6, "ill" should read -- in --.

Column 24,
Line 25, "jab" should read -- job --; and
Line 27, "erode," should read -- mode --.

Signed and Sealed this

Eighteenth Day of December, 2001

*Attest:*

*Attesting Officer*

JAMES E. ROGAN
*Director of the United States Patent and Trademark Office*